United States Patent
Mohr et al.

(10) Patent No.: US 9,525,582 B1
(45) Date of Patent: Dec. 20, 2016

(54) SELECTIVELY ORDERING APPLICATION OF PROVISIONING FROM MULTIPLE SOURCES FOR NETWORK EQUIPMENT

(75) Inventors: William J. Mohr, Cumming, GA (US); Loc Le, Lawrenceville, GA (US)

(73) Assignee: ARRIS Enterprises, Inc., Suwanee, GA (US)

( * ) Notice: Subject to any disclaimer, the term of this patent is extended or adjusted under 35 U.S.C. 154(b) by 383 days.

(21) Appl. No.: 13/492,349

(22) Filed: Jun. 8, 2012

(51) Int. Cl.
 *G06F 15/177* (2006.01)
 *H04L 29/06* (2006.01)
 *H04L 29/08* (2006.01)

(52) U.S. Cl.
 CPC ......... *H04L 29/06* (2013.01); *H04L 29/08072* (2013.01)

(58) Field of Classification Search
 USPC ........................................ 709/220, 223, 224
 See application file for complete search history.

(56) References Cited

U.S. PATENT DOCUMENTS

| | | | | |
|---|---|---|---|---|
| 2007/0223512 A1* | 9/2007 | Cooper | .................. | H04L 1/206 370/437 |
| 2008/0010358 A1* | 1/2008 | Jin | ..................... | H04L 41/0803 709/207 |
| 2009/0222600 A1* | 9/2009 | Lehr | ..................... | G06F 9/5027 710/39 |
| 2012/0042057 A1* | 2/2012 | Huang | ................. | H04L 41/082 709/221 |

* cited by examiner

*Primary Examiner* — Vivek Srivastava
*Assistant Examiner* — Hermon Asres
(74) *Attorney, Agent, or Firm* — Bart A. Perkins

(57) ABSTRACT

Methods, systems, and apparatuses can provide for prioritization of customer premise equipment configuration parameters. This can be facilitated by creating a hierarchical list of the different configuration methods (e.g., parameter sources) and applying parameter values from each of the parameter sources to the device in the order in which those parameter sources are included on the hierarchical list.

20 Claims, 4 Drawing Sheets

SELECTIVELY ORDERING APPLICATION OF PROVISIONING FROM MULTIPLE SOURCES FOR NETWORK EQUIPMENT

TECHNICAL FIELD

This disclosure relates to the provisioning of parameters in network equipment.

BACKGROUND

The Data-Over-Cable Service Interface Specification (DOCSIS) was established by cable television network operators to facilitate transporting data traffic, primarily Internet traffic, over existing community antenna television (CATV) networks. In addition to transporting data traffic, as well as television content signals over a CATV network, multiple services operators (MSO) also use their CATV network infrastructure for carrying voice, video on demand (VoD) and video conferencing traffic signals, among other types. Similarly, telecommunications companies (telcos) have expanded their offerings into high speed data and video offerings.

In order for an MSO to meet the demands of its customers, efficient means for configuring customer premise equipment (CPE) needed to be established. CPE devices depend on parameters to inform them how to operate. These parameters can include anything instructing the device on how to perform a function. These parameters can be established and altered by device manufacturers, MSOs, end-users, and technicians. Varying methods of remote and direct configuration have been implemented by MSOs including graphical user interface (GUI), command line interface (CLI), extensible markup language (XML), and simple network management protocol (SNMP). Device parameters controlled by these configuration methods can be set and modified by multiple parties including the device manufacturer, MSO, technicians, and the end user. However, conflicting instructions can create an issue when the same parameter is controlled by different configuration methods or different users.

BRIEF DESCRIPTION OF THE DRAWINGS

Like reference numbers and designations in the various drawings indicate like elements.

DETAILED DESCRIPTION

In some implementations of this disclosure, systems and methods can operate to build a working configuration of parameters by prioritizing various common configuration methods and parameter sources that are used to input or alter customer premise equipment (CPE) devices.

Because of varying methods for altering device parameters and multiple users having the capability to alter device parameters, problems can arise as conflicting values for the same parameter are set by multiple configuration methods or by different users. Without a way to establish priority for the varying parameter values coming from the different configuration methods and sources, a complex set of rules and exceptions are used. However, the implementation of these complex rules and exceptions results in less maintainable firmware for the end product, and less manageable product documentation.

Figure 1:
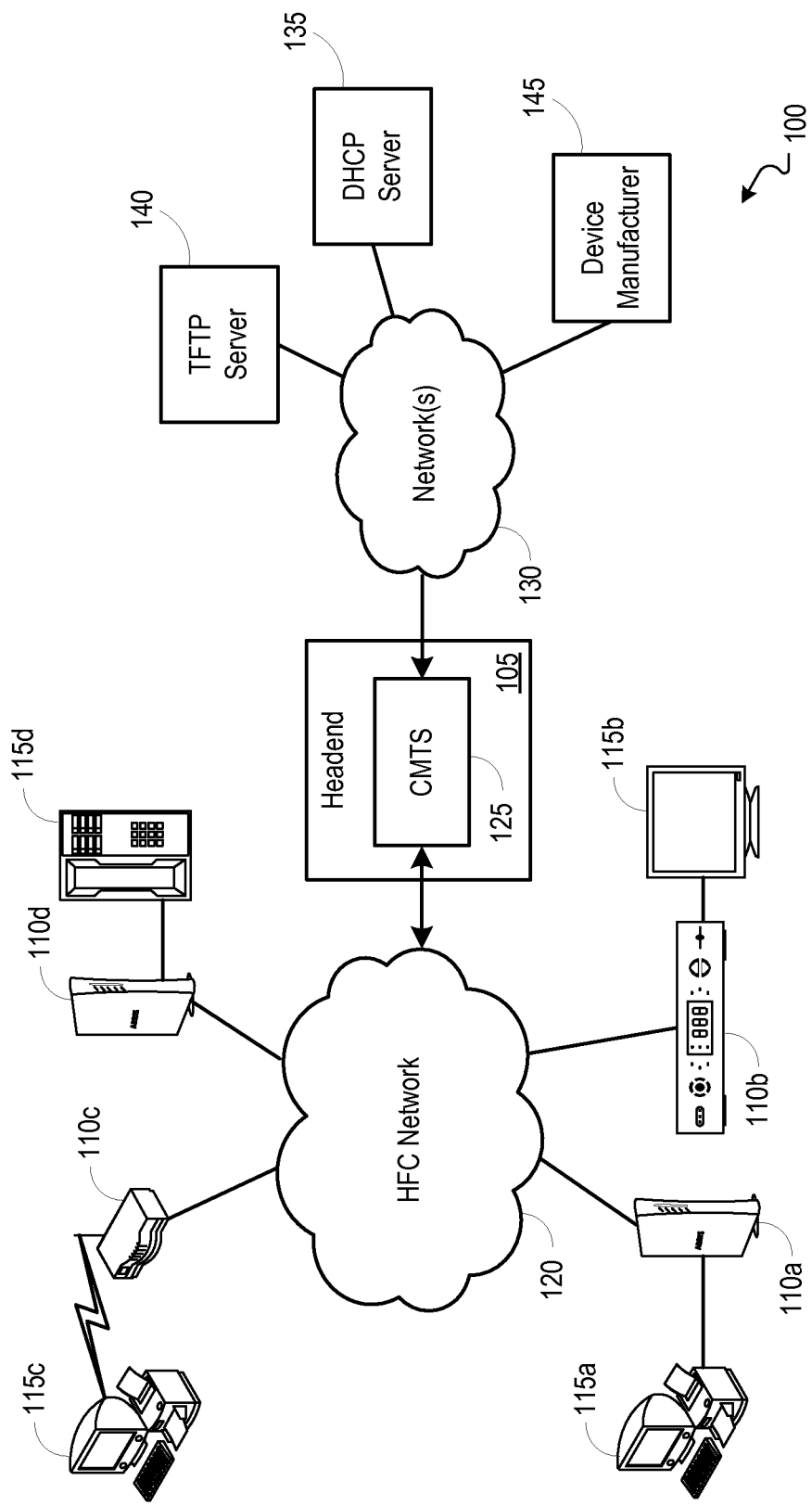
FIG. 1 is a block diagram illustrating an example network environment operable to selectively apply parameter configurations during provisioning.

FIG. 1 is a block diagram illustrating an example network environment 100 operable to selectively apply parameter configurations during provisioning. In some implementations, a headend 105 can provide video, data and/or voice service(s) to customer premise equipment (CPE) devices 110a-d in one or more subscriber groups (e.g., service group(s)). The CPE devices can include, for example, a cable modem 110a, a set top box 110b, a wireless router including an embedded cable modem 110c, or a media terminal adapter (MTA) 110d, among many others (e.g., digital subscriber line (DSL) modem, voice over internet protocol (VoIP) terminal adapter, video game console, digital versatile disc (DVD) player, communications device, etc.). A cable modem or embedded MTA (eMTA) 110a can facilitate communications from the headend 105 to a computer 115a. A set top box 110b can facilitate communications from the headend 105 to a television or a separate digital video recorder. A wireless router 110c can facilitate wireless communications with a computer 115c to a headend 105. An MTA 110d can facilitate communications between a telephone 115d and a headend 105.

The CPE devices 110a-d can communicate with the headend 105 via a hybrid fiber-coax (HFC) network 120. The headend 105 can include devices such as a cable modem termination system (CMTS) 125 and/or an edge quadrature amplitude modulation (EQAM) device (not shown), or a combined or converged device (not shown) including multiple edge and/or video or data processing functionalities. Such devices can operate to facilitate communications between a network 130 and the CPE devices 110a-d. In various implementations, the network 130 can include one or more networks internal to the headend and/or one or more networks external to the headend (e.g., one or more extranets, the Internet, etc.).

Data services can be handled by the headend 105 through a CMTS 125. The CMTS 125 can receive data signals from external device(s) or nodes through network(s) 130. The network(s) 130, for example, can operate using internet protocol (IP), sending data packets to and receiving data packets from the headend 105. In some examples, the CMTS 125 can be paired with a SIP proxy server (not shown) operable to provide voice over internet protocol (VoIP) services with voice connectivity to other subscribers or voice connectivity to a public switched telephone network (PSTN) (not shown). In still further examples, one or more video sources can provide streaming data through the network(s) 130 to the CMTS 125.

In some implementations, the CMTS 125 can forward packets destined for subscribers to an EQAM device used to modulate the signal onto a carrier waveform. The carrier waveform can include both data and video streams, in both multicast and unicast (e.g., point-to-point) formats for transmission to a combiner, which can combine multiple signals onto a single fiber for transmission to one or more CPE devices 110a-d via the hybrid fiber-coax (HFC) network

120. In other implementations, the CMTS 125 can modulate a baseband signal to a carrier wave and transmit the signal to a combiner.

When a CPE device 110a-d initially attempts to connect to the headend 105, the device 110a-d goes through a ranging and registration process with the headend 105. Ranging typically involves finding and locking onto a signal and determining a timing offset for the device 110a-d. The registration process typically includes retrieval of a configuration filename from a dynamic host control protocol (DHCP) server 135 through the network 130. Upon receipt of the configuration filename, the CPE device 110a-d identifies a trivial file transfer protocol (TFTP) server 140 where the configuration file is stored. The CPE device 110a-d then requests the configuration file from the TFTP server 140 using the filename provided by the DHCP server. Upon receiving the configuration file, the CPE device 110a-d registers with the CMTS 125.

In some implementations, an MSO can alter the parameters of a CPE device that is connected to its network by way of the simple network management protocol (SNMP). CPE devices contain a management information base (MIB) which can be used to store objects that represent the values for various parameters of the device. These values can represent certain characteristics of the CPE device (e.g., service set identifier (SSID) for wireless devices, device name, media access control address, IP address, etc.). The devices can also contain an agent that acts to communicate directly with the headend. When asked, the agent can provide information contained in the MIB to the MSO at the headend. At the headend, an administrator or service operator can use a network management station to target specific devices on the network and send and collect information to and from the CPE devices. Once identified, the network management station can send a command to the agent to change specific values stored in the device's MIB. Through the use of the SNMP, an administrator or service operator can alter the parameters of a specific CPE device which are stored on the CPE's MIB.

In some implementations, an MSO can alter CPE device parameters by using a graphical user interface (GUI) such as a webpage. By changing a parameter through the GUI, information identifying the change is sent to the CPE device through the HFC network 120 (or through another network). An end user can also change a device parameter by using a GUI such as a webpage. The end user's change can also be communicated to the CPE device through the HFC network 120 or committed locally.

In some implementations, a device manufacturer 145 can effect a change to CPE device parameters by sending firmware updates directly through the HFC network 120 to the CPE device.

Current solutions to the problem of having the same device parameter set by different methods or by different users dictate that the last configuration value written takes precedence over any existing setting. These solutions have led to the creation of complex rules and exceptions for allowing the MSO to maintain control over the settings of its CPE devices.

Figure 2:
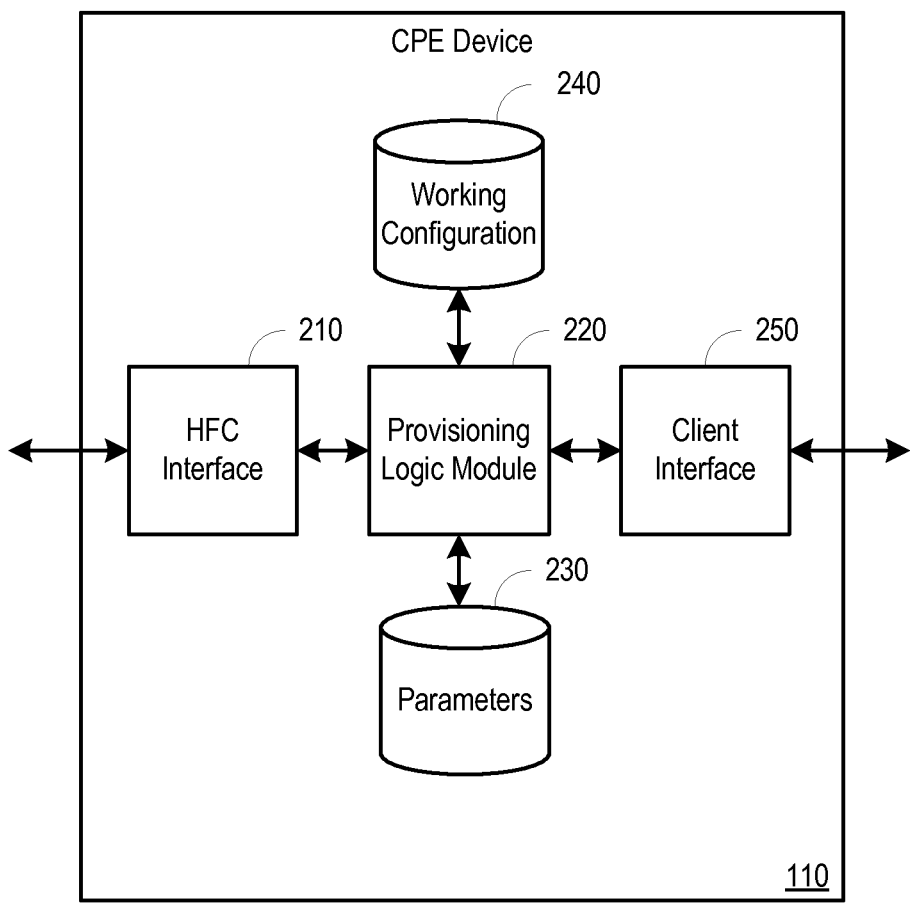
FIG. 2 is a block diagram illustrating an example customer premise equipment device operable to selectively order provisioning of parameter configurations.

FIG. 2 is a block diagram illustrating an example of a customer premise equipment (CPE) device 110 operable to selectively apply parameter configurations during provisioning. In some implementations, the CPE device 110 can include an HFC interface 210, a provisioning logic module 220, a default parameter data store 230, a working configuration parameter 240, and a client interface 250.

The HFC interface 210 can be used to provide an interface to the HFC network 120. It should be understood that in other devices, the HFC interface 210 can be replaced by a more generic network or peripheral interface. For example, in those implementations where the CPE device is a DVD player, the DVD player can include a network interface, or can include a port (e.g., a serial port) operable to facilitate provisioning updates from the user.

The provisioning logic module 220 is operable to locate parameter values for the CPE device in the HFC network 120, or other generic network, and in the parameter data store 230, and to apply the parameters to the working configuration parameters 240 in a prioritized order. The parameter data store 230 can be operable to store the default device parameters and any parameter updates received from various sources prior to power to the device being cycled. Each parameter update can include the source from which that update was applied. The client interface 250 is operable to provide a client interface, for example, to a host computer in the case of a cable modem or MTA device, or to a television for a set top box.

A hierarchical list can be created which will identify the different parameter sources and configuration methods associated with parameter entries in the parameter data store, in order of increasing priority, with the first source or method listed having the lowest priority and the last source or method listed having the highest priority. Also, for configuration methods capable of being accessed by multiple users, such as the device manufacturer, MSO, end-user, or a technician, an entry for each entity can be listed as separate methods. The hierarchical list can be restructured in order to accommodate the particular needs of the individual MSO. In some implementations, the order of the hierarchical list can be adjusted by an administrator using a service interface (e.g., including the web GUI, SNMP interface, command line interface, etc.). The hierarchical list is not limited to including only the common configuration methods and parameter sources, but can also include any other source of parameter input or update. The hierarchical list can be created and altered by the MSO.

In some implementations, the provisioning logic module 220 can retrieve the hierarchical list from the parameter data store. In other implementations, the provisioning logic module 220 can retrieve the hierarchical list from the MSO through the HFC interface 210. The list can then instruct the provisioning logic module 220 as to what sources to draw parameters from and in what order to apply them to the working configuration parameters 240. If the parameter source exists in the HFC network, such as a cloud-based user GUI, service provider GUI, or SNMP sources, then the provisioning logic module 220 can retrieve the parameters via the HFC interface 210. If the parameter source exists in the non-volatile memory of the device, such as default configuration parameters, firmware, locally stored user/service provider GUI, or locally stored SNMP parameters, then the provisioning logic module 220 can retrieve the parameters directly from the device's non-volatile memory.

In some implementations, a change to a single parameter value will be made through a cloud-based user GUI, service provider GUI, or SNMP source. When this case arises, the provisioning logic module 220 can receive the parameter value through the HFC interface 210, determine the relative locations of the parameter source identifiers of the single parameter value and the parameter value currently applied by the working configuration in the hierarchical list, and reject the single parameter value if its parameter source identifier has lower priority (e.g., listed higher in the hierarchical list) than that of the parameter value currently applied by the working configuration. If the parameter source identifier of the single parameter value has higher priority (e.g., listed lower in the hierarchical list) than or equal priority to that of the parameter value currently applied by the working configuration, then the provisioning logic module 220 can apply the single parameter value to the working configuration parameters 240.

Once the provisioning logic module 220 retrieves the hierarchical list from storage, it retrieves the device parameters from the source or method that is listed first in the list and applies such parameters to the working configuration parameters 240. The provisioning logic module 220 can then retrieve the device parameters from the source listed next in the hierarchical list and apply the retrieved parameters to the working configuration parameters 240. When applying the second source of parameters to the working configuration parameters 240, the parameters from the second source can replace any prior parameters applied by the working configuration parameters 240 when the prior parameters conflict. This process can continue until the parameters from each source listed in the hierarchical list have been retrieved by the provisioning logic module 220 and have been applied to the working configuration parameters 240.

When the provisioning logic module 220 has applied the parameters from each source in the hierarchical list, the working configuration parameters 240 will contain a working configuration of the parameters with the highest priority as determined by the MSO.

Figure 3:
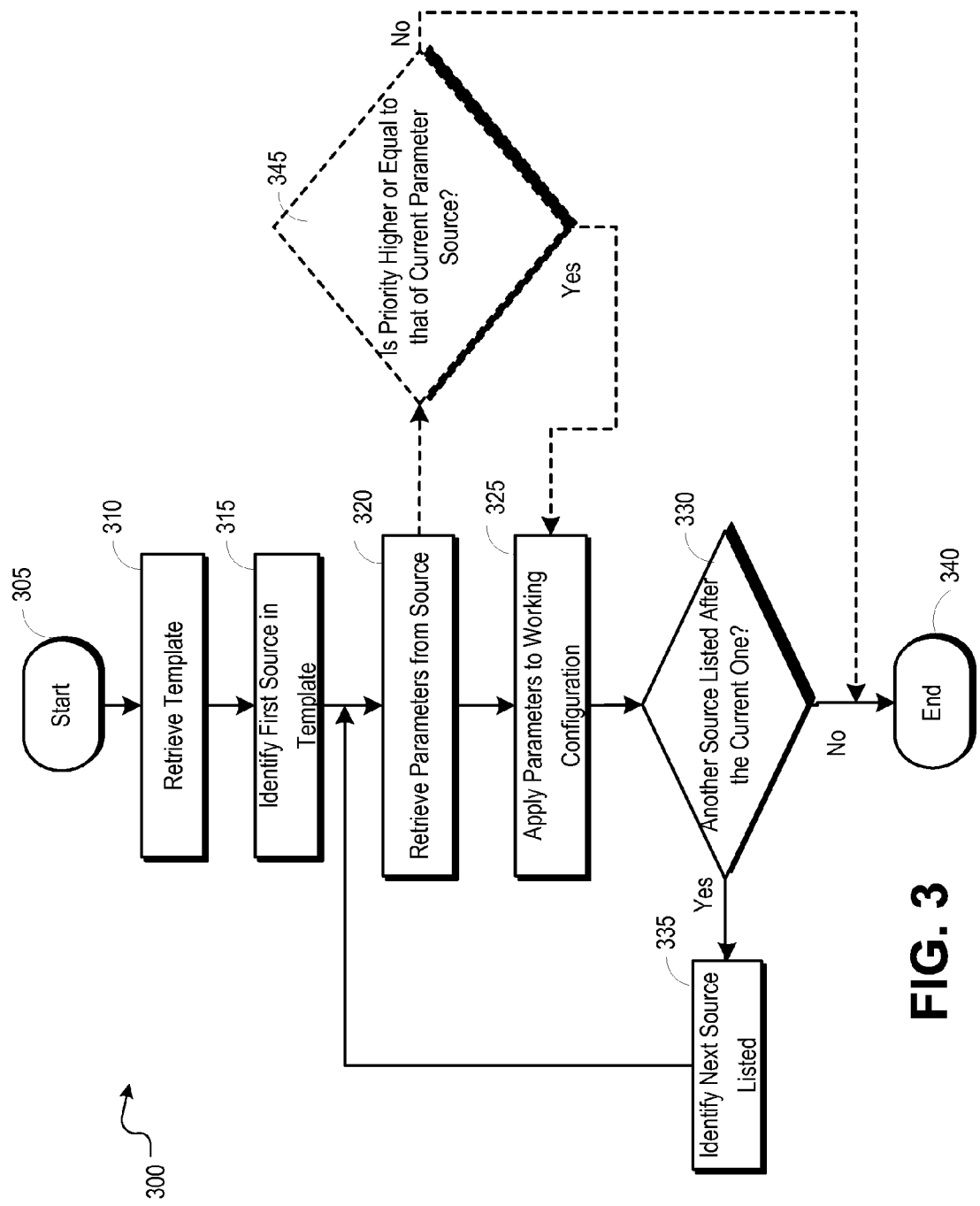
FIG. 3 is a flowchart illustrating an example process operable to build a working configuration of parameters by prioritizing parameter sources and configuration methods.

FIG. 3 is a flowchart illustrating an example process 300 operable to build a working configuration of parameters by prioritizing application of parameters from multiple sources. The process 300 can start at stage 305 with initializing (or reinitializing) a device. Alternatively the process 300 can start at stage 305 when a change is made to a parameter contained within one of the configuration methods or sources listed in the hierarchical list.

At stage 310, a hierarchical list can be retrieved. The hierarchical list can be retrieved, for example, by a provisioning logic module (e.g., provisioning logic module 220 of FIG. 2). The hierarchical list, for example, could be retrieved from a parameter data store or from a remote source, e.g., through a network interface 210. Upon retrieval, the list can be accessed by the provisioning logic module to identify the parameter sources and configuration methods listed and the precedence of the sources or methods relative to each other.

At stage 315, the parameter source that is listed first in the hierarchical list is identified. The parameter source can be identified, for example, by provisioning logic (e.g., provisioning logic module 220 of FIG. 2). The provisioning logic module 220 can recognize the sources listed and the order of their priority.

At stage 320, parameters can be retrieved from the identified parameter source. The parameters can be retrieved, for example, by a provisioning logic (e.g., provisioning logic 220 of FIG. 2). In some implementations, the location of a parameter can be identified based on matching a parameter source name from the hierarchical list with a filename in a parameter data store (e.g., parameter data store 230 of FIG. 2). Retrieval of the parameters can be accomplished, for example, by requesting the parameters from the parameter data store. Alternatively, the parameters can be retrieved, for example, by requesting the parameters from a component of an external network (e.g., the HFC network), and receiving the parameters through a network interface.

At stage 325, the parameters retrieved from a currently identified parameter source are applied to the working configuration parameters. The parameters can be applied, for example, by provisioning logic (e.g., provisioning logic module 220 of FIG. 2) in conjunction with the working configuration (e.g., working configuration parameters 240 of FIG. 2). In some instances, the parameters retrieved can include parameters that are already set in the working configuration parameters 240. In these instances, the parameters currently retrieved can replace the parameters that have been previously applied, since the later listed parameter sources have precedence over the earlier listed parameter sources. In some instances, the parameters retrieved will include parameters that are not yet applied to the working configuration parameters. In these instances, the provisioning logic module 220 will apply the retrieved parameters to the working configuration parameters 240. As an example, each parameter can be distinguished by name. The name can include a portion which identifies the parameter source from which it was retrieved and a portion which identifies the device function that it controls. The working configuration parameters 240 can hold only one value for each parameter that controls a specific function. When the provisioning logic module 220 attempts to apply a retrieved parameter to the working configuration parameters 240, but the working configuration parameters already holds a value for the parameter controlling that specific function, the provisioning logic module 220 will replace the parameter existing in the working configuration parameters with the parameter that it has just retrieved from the currently identified parameter source.

At stage 330, a determination is made whether there is a parameter source listed in the hierarchical list that follows the parameter source currently identified. The determination can be made, for example, by the provisioning logic module (e.g., provisioning logic module 220 of FIG. 2). If another source is listed, then the provisioning logic module will move to stage 335 and identify the next source that is listed. Upon identification of the parameter source listed next, the process proceeds to stage 320 and repeats stages 320-30. If no parameter source is listed in the hierarchical list after the currently identified parameter source, then the process 300 ends at stage 340.

In some implementations, at stage 345, a determination can be made whether the source from which the parameter value was retrieved has higher priority than or equal priority to that of the parameter value currently applied by the working configuration. The determination can be made, for example, by the provisioning logic module (e.g., provisioning logic module 220 of FIG. 2). If the source has higher priority than or equal priority to that of the parameter value currently applied by the working configuration, then the provisioning logic module will move to stage 325 and apply the parameter value to the working configuration parameter 240. If the source has lower priority than that of the parameter value currently applied by the working configuration, then the process 300 ends at stage 340.

At the end of the process 300, the working configuration parameters 240 will contain a value for every parameter that the various parameter sources have set for operation of the device, and every parameter value set by the provisioning logic will be associated with the highest priority source for that parameter value.

Figure 4:
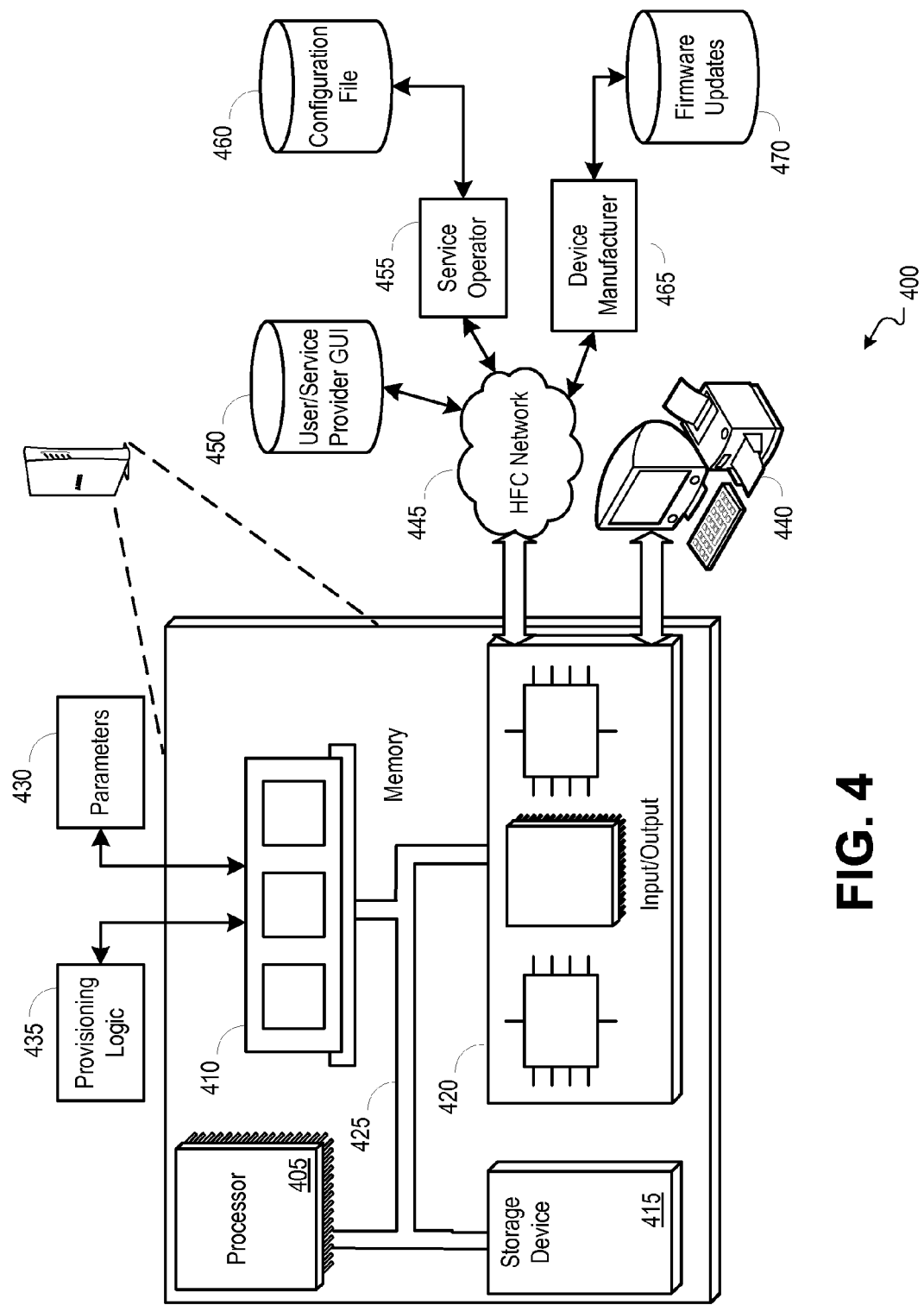
FIG. 4 is a generic block diagram of a hardware configuration for a customer premise system operable to apply parameter configurations for provisioning in a selective order.

FIG. 4 is a block diagram of an example hardware configuration for a CPE device 400 operable to apply parameter configuration in a selective order during provisioning. While an eMTA is shown in this example, it should be understood that many different kinds of devices (e.g., including cable modems, DSL modems, wireless routers, consumer electronic devices, etc.) can include systems and processes to provide selectively ordered provisioning of parameter configurations. The CPE device 400 can include a processor 405, a memory 410, a storage device 415, and an input/output device 420. Each of the components 405, 410, 415, and 420 can, for example, be interconnected using a system bus 425. The processor 405 is capable of processing instructions for execution within the device 400. In one implementation, the processor 405 is a single-threaded processor. In another implementation, the processor 405 is a multi-threaded processor. The processor 405 is capable of processing instructions stored in the memory 410 or on the storage device 415.

The memory 410 stores information within the device 400. In one implementation, the memory 410 is a computer-readable medium. In one implementation, the memory 410 is a volatile memory unit. In another implementation, the memory 410 is a non-volatile memory unit. In some implementations, the memory 410 can store the default configuration parameters 430. In some implementations, the memory 410 can store the provisioning logic module 435.

In some implementations, the storage device 415 is capable of providing mass storage for the device 400. In one implementation, the storage device 415 is a computer-readable medium. In various different implementations, the storage device 415 can, for example, include a hard disk device, an optical disk device, flash memory or some other large capacity storage device.

The input/output device 420 provides input/output operations for the device 400. In one implementation, the input/output device 420 can include one or more of a plain old telephone interface (e.g., an RJ11 connector), a network interface device, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, such as one or more subscriber devices 440 (e.g., set top box, cable modem, etc.), as well as sending communications to, and receiving communications from a network 445. Other implementations, however, can also be used, such as mobile computing devices, mobile communication devices, set-top box television client devices, etc.

The input data can include, for example, data from the user through a graphical user interface (GUI) 450, data from the MSO 455 through a GUI 450, data from the MSO 455 through configuration files 460, or data from the device manufacturer 465 through firmware updates 470.

The CPE devices of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

The term "system processor" encompasses all apparatus, devices, and machines for processing data, including by way of example a programmable processor, a computer, or multiple processors or computers. The system processor can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The elements of a computer typically include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile communications device, a telephone, a cable modem, a set-top box, a mobile audio or video player, or a game console, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be operable to interface with a computing device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

What is claimed is:

1. A computer-implemented method, comprising:
   retrieving a hierarchical list, the hierarchical list comprising an ordered list of a plurality of parameter source identifiers, wherein each respective one of the plurality of parameter source identifiers identifies a parameter source associated with a configuration method used to create or change parameters of a device, wherein the parameter source identifiers are ordered within the hierarchical list according to a priority associated with the configuration method of the parameter source identified by each parameter source identifier;
   receiving parameter values from a first parameter source, wherein the first parameter source is associated with a first parameter source identifier within the hierarchical list;
   in response to receiving the parameter values from the first parameter source, determining whether parameter values are available from one or more other parameter sources that are associated with a higher priority than the priority associated with the first parameter source; and
   if parameter values are available from at least one other parameter source that is associated with a higher priority than the priority associated with the first parameter source:
      applying the parameter values received from the first parameter source to a working configuration, the parameter values received from the first parameter source being associated with the first parameter source as set by the associated configuration method;
      retrieving parameter values associated with a second parameter source, wherein the second parameter source has a higher priority than the first parameter source according to the hierarchical list of parameter source identifiers; and
      overwriting one or more parameter values of the working configuration as set by the first parameter source with corresponding parameter values associated with the second parameter source, if the corresponding parameter values associated with the second parameter source are different from the one or more corresponding parameter values of the working configuration as set by the first parameter source.

2. The computer-implemented method of claim 1, further comprising:
   rejecting an input parameter value if the parameter source identifier of the previous parameter value has higher priority in the hierarchical list than the parameter source identifier of the input parameter value.

3. The computer-implemented method of claim 2, further comprising:
   applying an input parameter value to a working configuration if the parameter source identifier of the input parameter value has higher priority than or equal priority to the parameter source identifier of the previous parameter value.

4. The computer-implemented method of claim 1, further comprising:
   providing an interface configured to be used to modify the order of the parameter source identifiers within the hierarchical list.

5. The computer-implemented method of claim 1, wherein the plurality of parameter source identifiers includes DOCSIS parameters.

6. The computer-implemented method of claim 1, wherein the plurality of parameter source identifiers includes network interface parameters.

7. The computer-implemented method of claim 6, wherein the network interface parameters comprise local area network or wireless network parameters.

8. The computer-implemented method of claim 1, wherein one or more of the parameter source identifiers identifies parameter values to be retrieved from a remote parameter source.

9. The computer-implemented method of claim 8, wherein one or more of the parameter source identifiers identifies parameter values to be retrieved from a local parameter source.

10. The computer-implemented method of claim 1, wherein parameters from a default source are applied first, parameters from a service operator are applied after parameters associated with the default source, and parameters from a user are applied after parameters from the service operator.

11. A system, comprising:
a provisioning module configured to use a hierarchical list to determine an order in which to apply parameter values associated with a plurality of parameter sources, the hierarchical list comprising an ordered list of a plurality of parameter source identifiers, wherein each respective one of the plurality of parameter source identifiers identifies a parameter source associated with a configuration method used to create or change parameters of a device, wherein the parameter source identifiers are ordered within the hierarchical list according to a priority associated with the configuration method of the parameter source identified by each parameter source identifier;
a data store configured to store the hierarchical list and parameter values associated with the plurality of parameter sources;
wherein, in response to receiving one or more parameter values from a first parameter source, the provisioning module is further configured to:
  determine whether parameter values are available from one or more other parameter sources that are associated with a higher priority than the priority associated with the first parameter source;
  if parameter values are available from one or more other parameter sources that are associated with a higher priority than the priority associated with the first parameter source, identify a next parameter source from the hierarchical list, wherein the next parameter source has a higher priority than the first parameter source;
  retrieve parameter values associated with the next parameter source; and
  apply the retrieved parameter values to a working configuration associated with a customer premise equipment device, overwriting one or more previously written values in the working configuration with one or more corresponding retrieved parameter values, if the one or more previously written values in the working configuration are different from the one or more corresponding retrieved parameter values; and
wherein the provisioning module is configured to repeat the process for each parameter source included in the hierarchical list.

12. The system of claim 11, further comprising:
an interface configured to be used to modify the order of the hierarchical list.

13. The system of claim 11, wherein the plurality of parameter sources includes DOCSIS parameters, and wherein the plurality of parameter sources includes network interface parameters wherein the network interface parameters comprise local area network or wireless network parameters.

14. The system of claim 11, wherein one or more of the parameter sources identifies parameter values to be retrieved from a remote parameter source.

15. The system of claim 14, wherein one or more of the parameter sources identifies parameter values to be retrieved from a local parameter source.

16. The system of claim 11, wherein the provisioning module is further configured to apply parameters from a default source first, apply parameters from a service operator after parameters associated with the default source, and apply parameters from a user after parameters from the service operator.

17. One or more non-transitory computer readable media operable to execute on a processor, the computer readable being operable to cause the processor to perform the operations comprising:
retrieving a hierarchical list, the hierarchical list comprising an ordered list of a plurality of parameter source identifiers, wherein each respective one of the plurality of parameter source identifiers identifies a parameter source associated with a configuration method used to create or change parameters of a device, wherein the parameter source identifiers are ordered within the hierarchical list according to a priority associated with the configuration method of the parameter source identified by each of the parameter source identifiers;
receiving parameter values from a first parameter source, wherein the first parameter source is associated with a first parameter source identifier within the hierarchical list;
in response to receiving the parameter values from the first parameter source, determining whether parameter values are available from one or more other parameter sources that are associated with a higher priority than the priority associated with the first parameter source; and
if parameter values are available from at least one other parameter source that is associated with a higher priority than the priority associated with the first parameter source:
applying the parameter values received from the first parameter source to a working configuration;
retrieving parameter values associated with a next parameter source on the hierarchical list of parameter source identifiers, wherein the next parameter source has a higher priority than the priority associated with the first parameter source;
applying the retrieved parameter values to the working configuration, the retrieved parameter values being associated with the next parameter source as set by the associated configuration method;
overwriting one or more previous parameter values of the working configuration as set by previous parameter sources with one or more corresponding parameter values associated with the next parameter source if the one or more previous parameter values are different from the one or more corresponding parameter values associated with the next parameter source; and
repeating the method until the parameter values from all of the plurality of parameter source identifiers included on the list have been applied.

18. The one or more non-transitory computer-readable media of claim 17, further operable to cause the processor to perform the operations comprising:
providing an interface operable to modify the order of the hierarchical list.

19. The one or more non-transitory computer-readable media of claim 17, wherein the plurality of parameter source identifiers includes DOCSIS parameters, and wherein the plurality of parameter source identifiers includes network interface parameters wherein the network interface parameters comprise local area network or wireless network parameters.

20. The one or more non-transitory computer-readable media of claim 17, wherein one or more of the parameter source identifiers identifies parameter values to be retrieved from a remote parameter source, and wherein one or more of the parameter source identifiers identifies parameter values to be retrieved from a local parameter source.

* * * * *